United States Patent
Mack

(10) Patent No.: US 7,557,906 B2
(45) Date of Patent: Jul. 7, 2009

(54) DISTANCE MEASUREMENT INSTRUMENT

(75) Inventor: Stefan Mack, Freiburg (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 11/881,656

(22) Filed: Jul. 26, 2007

(65) Prior Publication Data

US 2008/0024754 A1    Jan. 31, 2008

(30) Foreign Application Priority Data

Jul. 28, 2006   (DE) ................ 10 2006 034 926

(51) Int. Cl.
   *G01C 3/08* (2006.01)
(52) U.S. Cl. .................................. 356/4.01
(58) Field of Classification Search ....... 356/3.01–3.15, 356/4.01–4.1, 5.01–5.15, 6–22, 28, 28.5, 356/139.01–139.1
   See application file for complete search history.

(56) References Cited

U.S. PATENT DOCUMENTS

| | | | | |
|---|---|---|---|---|
| 4,357,104 | A * | 11/1982 | Davinson | 356/4.07 |
| 5,796,098 | A * | 8/1998 | Azzam | 250/231.13 |
| 2002/0125435 | A1 | 9/2002 | Cofer et al. | |
| 2004/0004723 | A1* | 1/2004 | Seko et al. | 356/498 |
| 2004/0005092 | A1 | 1/2004 | Tomasi | |
| 2006/0152704 | A1* | 7/2006 | Bani-Hashemi | 356/3.1 |
| 2008/0137061 | A1* | 6/2008 | Rush | 356/4.04 |

FOREIGN PATENT DOCUMENTS

| | | |
|---|---|---|
| DE | 2209030 A | 9/1972 |
| DE | 35 13 671 A1 | 10/1986 |
| DE | 3618624 A1 | 12/1987 |
| DE | 40 02 356 C1 | 2/1991 |
| DE | 43 40 756 A1 | 6/1994 |
| DE | 20010830 U1 | 6/2000 |
| DE | 10242374 A1 | 4/2004 |
| DE | 102004052205 A1 | 5/2006 |
| EP | 1 246 148 A3 | 10/2002 |
| GB | 2 395 261 A | 5/2004 |
| JP | 2006-184065 | 6/2006 |
| JP | 2006184065 A | 7/2006 |

* cited by examiner

*Primary Examiner*—Thomas H Tarcza
*Assistant Examiner*—Luke D Ratcliffe
(74) *Attorney, Agent, or Firm*—Townsend and Townsend and Crew, LLP

(57) ABSTRACT

A distance measurement device which has a lighting unit, including transmission optics with light beam forming optics. Illumination patterns are formed on objects in the measurement area which differ depending on the distances from the measurement device. A light receiving unit is arranged adjacent the lighting unit and generates an image of the illuminated object via receiving optics. A detector array is located in the image plane of the receiving optics which converts the optical image into corresponding electrical signals. The signals from the detector area are forwarded to a signal processing unit that is capable of generating information concerning the distance between the object and the distance measurement device from the detected illumination pattern and the signals generated by the detector.

5 Claims, 1 Drawing Sheet

DISTANCE MEASUREMENT INSTRUMENT

RELATED APPLICATIONS

This application is based on and claims the priority of German patent application DE 10 2006 034 926.1 filed Jul. 28, 2006, which is incorporated herein by reference.

BACKGROUND OF THE INVENTION

The present invention concerns an optoelectronic distance measurement device for determining the distance of an object in a measurement area from the device.

Such optoelectronic distance measurement devices are used, for example, for optoelectronically determining the distance from the measurement device of an object that is located in a given measurement area. This allows one, for example, to classify objects on a conveyor band on the basis of their size or to determine the fill level of containers, and to forward this information to a central monitoring location or unit.

Known optoelectronic distance measurement devices capable of making such distance determinations can be roughly divided into two groups based on their underlying technology. One group of such measurement devices determines the distance by triangulation, as is described, for example, in German patent publication DE 35 13 671 C2. The triangulation method directs a focused light beam from the measurement device towards the object. Upon impact, a portion of the light beam is reflected in the form of a scattered light cone. A section of the scattered light cone is sensed by a light receiver that is located at a predefined distance from the light emitter. The light receiver used in the triangulation device can determine the angle at which the light reflected by the object strikes the light receiver.

Light emitter, object and light receiver form a triangle. The distance between the light emitter and the light receiver is known.

The angle between the emitted and received light beams measured by the light receiver can be used to determine the distance to the object.

The second group of such distance measurement devices uses the elapsed light flight time to determine the distance. As is described in DE 40 02 356 C1, for example, a light beam is directed from a light source in the direction of a measurement length. If the light beam strikes an object, a certain portion of the light is reflected back in the direction of the light emitter. A light receiver is arranged in the immediate vicinity of the light source, receives the light reflected by the object, and converts it into corresponding electrical signals. The distance of the object from the distance measurement device can be determined from the elapsed time between the emission of the light beam and the receipt of the reflected light beam by taking the speed of light into consideration. Such an elapsed time distance measurement can employ a phase measurement process, as is described, for example, in DE 40 02 356 C1, or a pulse length time measurement process, as is described, for example, in DE 43 40 756 C2.

The word "light" as used herein is not limited to visible light. "Light" refers generally to electromagnetic radiation, such as UV-light, IR-light, as well as visible light, all of which are commonly used in connection with optoelectronic sensors.

A disadvantage of the triangulation method for determining distance is that the measurement devices have a relatively low accuracy, especially when the base distance between the light emitter and the light receiver is small. Increasing this distance to improve accuracy, however, appreciably increases the size of the measurement device. Distance measurement devices which determine the distance of the object on the basis of elapsed time (pulse running time or phase measurement) are costly to produce because of the very short times that must be measured with a high degree of accuracy. As a result, such distance measurement devices are not used due to their cost.

BRIEF SUMMARY OF THE INVENTION

It is an object of the present invention to provide a distance measurement device capable of determining the distance of an object over large measurement areas and which is of small size and relatively inexpensive to produce.

A distance measurement device made in accordance with the present invention has a lighting unit, including transmission optics with light beam forming optics. Illumination patterns are formed on objects in the measurement area which differ depending on the distances from the measurement device. A light receiving unit is preferably arranged adjacent the lighting unit and generates an image of the illuminated object via receiving optics. A detector array is located in the image plane of the receiving optics which converts the optical image into corresponding electrical signals. The signals from the detector area are then forwarded to a signal processing unit that is capable of generating information concerning the distance between the object and the distance measurement device from the detected illumination pattern and the signals generated by the detector.

An advantage of the present invention is that the illumination pattern on the object formed by the beam forming optics changes with the distance of the object from the measurement device. This distance-dependent illumination pattern is received by the light receiving unit, which has a very large focal depth, and is then used. This enables generating distance information in a simple manner.

In a preferred embodiment of the invention, the beam forming optics have a plurality of spatially separated multi-zone arrangements about a common axis. Each of these zones has beam forming characteristics which differ from those of the other zones. Each zone of the beam forming optics therefore generates a partial lighting beam with its own beam cross-section profile. As the distance from the light beam forming optics increases, these partial illumination beams, each with a different light beam cross-section profile, overlap so that the sum of the partial light beams results in a beam bundle that has a very characteristic beam cross-section profile over the length of the beam.

It is preferred that the individual zones of the beam forming optics are rotationally symmetric in the form of circle segments or rings. This assures that the resulting light beam bundle differently and symmetrically varies the illumination patterns in a symmetrical manner over the measurement distance.

In a particularly preferred embodiment of the invention, a cylindrical lens is arranged in each zone of the light forming optics. Each of these cylindrical lenses has a focal length and a cylinder axis orientation which differ from those for the other cylindrical lenses. In this manner, it is for example possible to generate with the collimated light beam from each zone of the beam forming optics a thinly lit line (light line) at a different distance, with each light line having a different rotational orientation.

According to another embodiment of the present invention, the beam forming optics is a diffracting optical element (DOE). Diffractive optical elements can be inexpensively produced, for example in a stamping process, and can be used in the beam forming optics to inexpensively generate illuminating light beams with different beam cross-section profiles over the lengths of the beams to thereby also generate different illumination patterns.

Another embodiment of the present invention contemplates imaging different bar code patterns with the beam forming optics at different distances from the measurement device. By using lighting patterns in the form of bar codes, it becomes possible to integrate distance information into the illumination pattern. This significantly simplifies subsequent signal processing to obtain distance information from the illumination pattern.

A specific embodiment of the invention is illustrated in the drawings further discussed and explained below in connection with the appended drawings.

DESCRIPTION OF THE PREFERRED EMBODIMENTS

Figure 1:
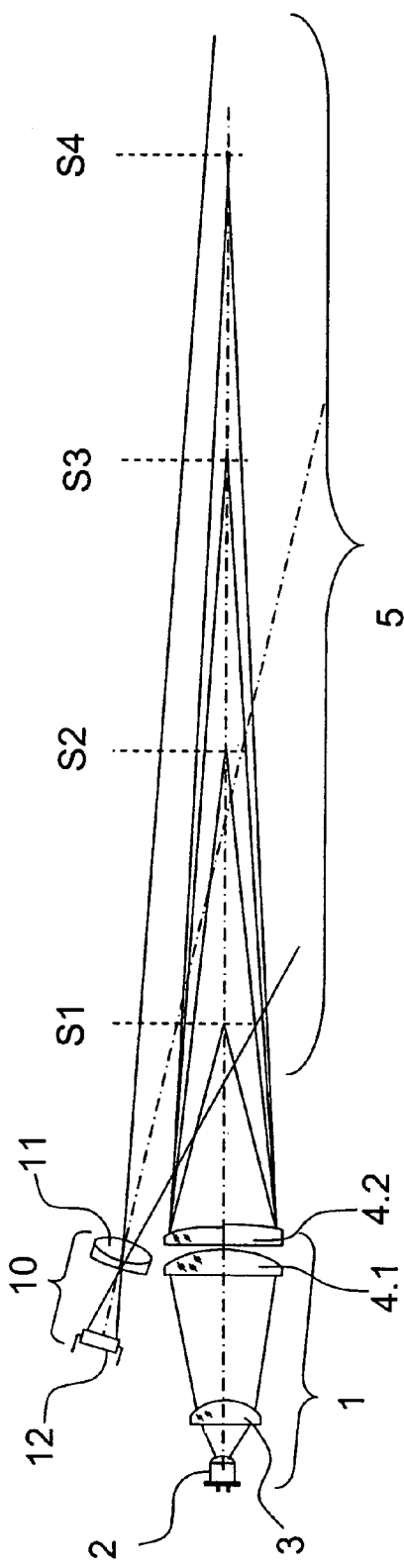
FIG. 1 is a cross-sectional view of an optoelectronic distance measuring device which has a lighting unit and a light receiving unit constructed in accordance with the present invention.

FIG. 1 schematically illustrates the distance measuring device of the present invention which has a lighting unit 1 and a light receiving unit 10. The lighting unit 1 and the light receiving unit 10 are arranged in close proximity to each other so that the angle between their optical axes is small. However, if desired, a beam splitting mirror or a geometrically uncoupling mirror can be used which permits a positioning of lighting unit 1 and light receiving unit 10 so that their optical axes outside the distance measuring device extend parallel to each other. Lighting unit 1 includes a light source 2 and a transmitting optic that is aligned therewith. Light source 2 is preferably a semiconductor light source such as a laser or an LED. However, other light sources can also be employed. In the embodiment illustrated in FIG. 1, the transmitting optics are formed by a collimating lens 3 and a beam forming optic arrangement in the form of a transmitting lens 4.1 and a multi-zone lens 4.2. Collimator lens 3 and the beam forming optics direct light from source 2 to a measurement area 5.

The principal components of light receiver 10 are a receiving optics 11 and a two-dimensional detector array 12. The detector array has a multitude of light sensitive elements such as, for example, CMOS or CCD elements which are arranged in a two-dimensional matrix. Objects which are present in measurement area 5 in front of beam forming optics 4 are imaged by receiving optics 11 on detector array 12. The receiving optics 11 is dimensioned to have a large focal depth so that each object within the entire measurement area 5 forms a sharp image on detector array 12. This can be attained, for example, by providing the receiving optics with a small numerical aperture or by constructing it as an adaptive optics with a high focal depth.

Figure 2:
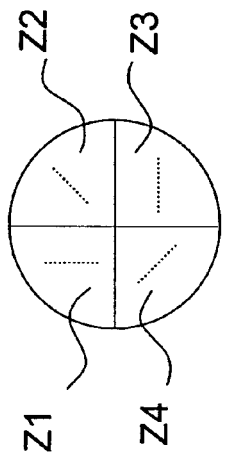
FIG. 2 is a plan view of a beam forming optics with a four-zone optic.

FIG. 2, which is a frontal view of multi-zone lens 12 of the two-part beam forming optics, shows that in the illustrated embodiment the multi-zone lens has four quadrants or quarter circles Z1 to Z4 which are of equal sizes. Each quarter circle Z1 to Z4 corresponds to one zone and has its own cylindrical lens. The cylindrical lenses in the four quadrant zones Z1 to Z4 differ from each other in that each cylindrical lens has a different focal length and a different cylinder axis orientation. For example, the cylinder lens of quadrant Z1 has the shortest focal length and the axis of this cylinder is vertical, while the cylinder of quadrant Z4 has the greatest focal length and its axis in quarter circle zone Z4 extends horizontally.

Figure 3:
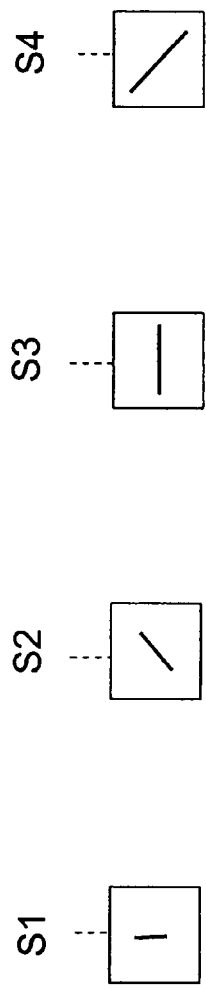
FIG. 3 is a schematic representation of several illumination patterns which change with the distance to the distance measuring device.

FIG. 3 illustrates the optical effect of the different cylinder lenses in the four quadrant zones Z1 to Z4 on the emitted beam cross-sections in measurement zone 5. As stated, the cylinder lens in quadrant Z1 has the shortest focal length, and its axis extends in a vertical direction. This means that the main cross-section of the cylinder lens with the greatest effect extends horizontally, while the main cross-section of the cylinder lens with the least effect, identified as cylinder axis, extends in the vertical direction. As a result, the proportion of the light from light source 2 which is emitted by the beam forming optics in the quadrant Z1 generates a vertical, thin illuminated line (light line) at a distance S1. The light proportions which are emitted through quadrants Z2 to Z4 are superimposed over the thin, vertical light line. Since the cross-sections of these light portions from quadrants Z2 to Z4 at distance S1 are relatively large, the contrast of the thin vertical light line is somewhat reduced, but this results in no appreciable degradation.

The other quadrants function analogously to the above example for the quadrant Z1. The cylinder lenses for the other quadrants have an increasingly reduced refractive power and cylindrical axes rotated by 45°. In this manner, additional, thin light lines with different orientations are generated at distances S2, S3 and S4. In the intervals, such as the interval between S2 and S3, the illumination patterns continuously change while exhibiting some blurriness from one light line orientation to the next.

When the object is inside the measurement zone 5, a different illumination pattern is formed on the object in dependence on its spacing from the distance measuring device. This illumination pattern is captured by light receiving unit 10 in that the receiver optics 11 images this illumination pattern on detector array 12. To assure the formation of high quality images over the entire extent of measurement area 5, the receiving optics has a large focal depth.

The distance-dependent illumination pattern formed on detector array 12 is fed to a signal processing unit (not shown in the drawings). The signal processing unit determines with the help of an image processor the orientation of the illuminated line. By comparing it with previously stored line samples, the distance measurement device of the present invention can determine the position, orientation and distance of the object from the distance measuring device.

What is claimed is:

1. An optoelectronic distance measurement device comprising a lighting unit including a light source and transmitting optics for directing light from the source to an object in a measurement area, a light receiver including light receiving optics and a light detector array, the light receiving optics forming an image of the object in the measurement area on the light detector array, the light detector array generating signals caused by the image of the object, the light transmitting optics including beam forming optics which cause the formation of different types of illumination patterns on the object at different distances from the measurement device, each type of illumination pattern having its own beam cross-section, the beam forming optics including a plurality of spatially separate multi-zone optical elements arranged about a common axis, light emitted from each optical element of the beam forming optics having a beam forming characteristic that generates a different type of illumination pattern from beam forming characteristics of the other multi-zone optical elements, each optical element having a cylindrical lens which has a focal depth and a cylinder axis orientation which differ from the focal lengths and the cylinder axis orientations of the other cylindrical lenses, and the multi-zone optical elements generating line-shaped illumination patterns on the object which have different rotational directions in dependence on the distance of the object from the measurement device, and a signal processor receiving the signals and therewith generating information from the illumination patterns concerning the distance between the object and the distance measurement device.

2. An optoelectronic distance measuring device according to claim 1 wherein the optical elements comprise one of circular segments and rings.

3. An optoelectronic distance measurement device comprising a lighting unit including a light source and transmitting optics for directing light from the source to an object in a measurement area, a light receiver including light receiving optics and a light detector array, the light receiving optics forming an image of the object in the measurement area on the light detector array, the light detector array generating signals caused by the image of the object, the light transmitting optics including beam forming optics which cause the formation of different illumination patterns on the object at different distances from the measurement device and having a plurality of multi-zone optical elements each including a beam forming characteristic that differs from beam forming characteristics of the others and each comprising a cylindrical lens which has a focal depth and a cylinder axis orientation which differs from the focal lengths and the cylinder axis orientations of the other cylindrical lenses, and a signal processor receiving the signals and therewith generating information from the image patterns concerning the distance between the object and the distance measurement device.

4. An optoelectronic distance measuring device according to claim 3 wherein the beam forming optics comprises a diffractive optical element.

5. An optoelectronic distance measuring device according to claim 3 wherein the beam forming optics generate a bar code pattern on the object which changes in dependence on the distance of the object from the distance measurement device.

* * * * *